Feb. 2, 1926. 1,571,759
R. L. DIAMOND
AGRICULTURAL IMPLEMENT
Original Filed Sept. 6, 1924 2 Sheets-Sheet 2
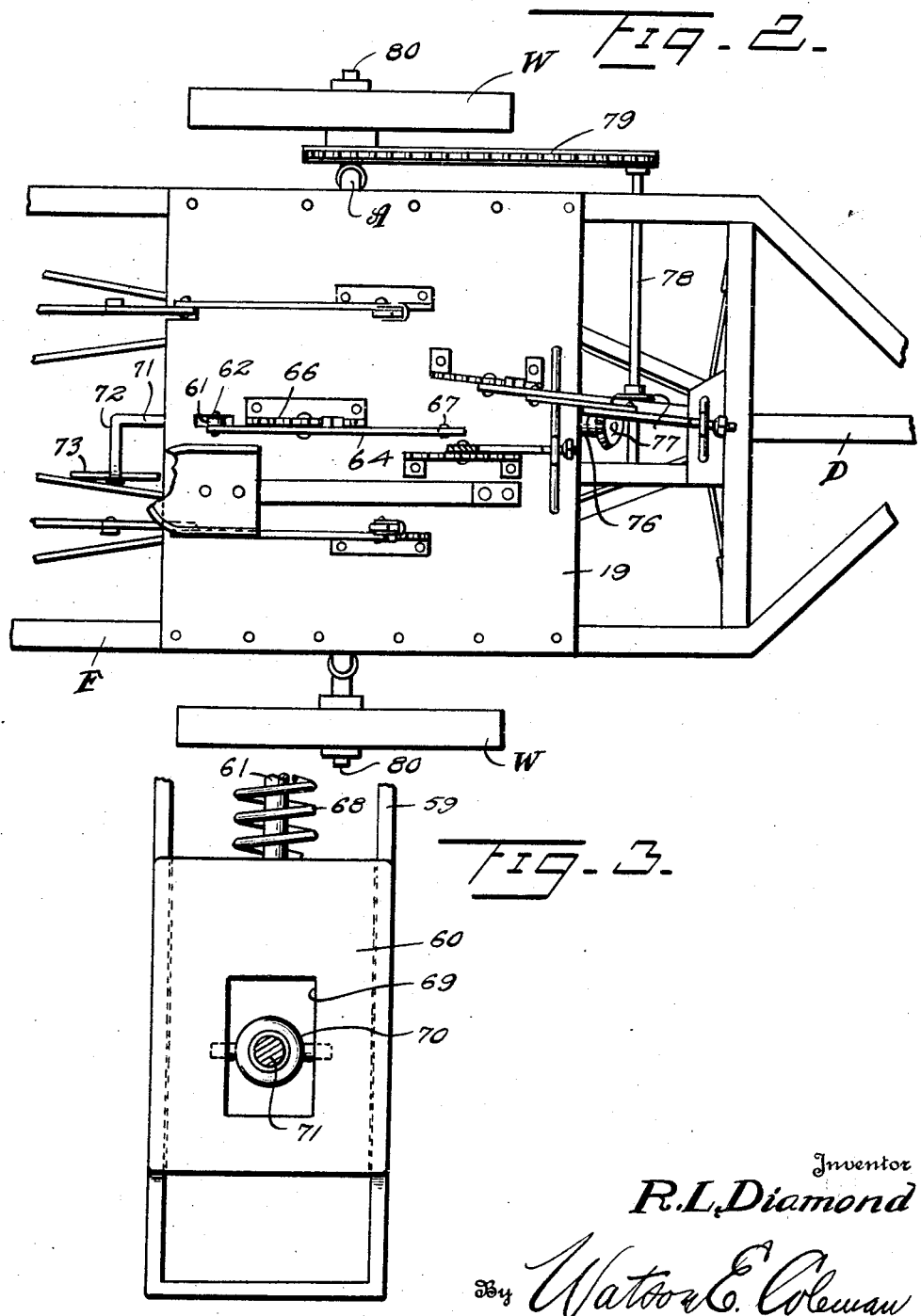

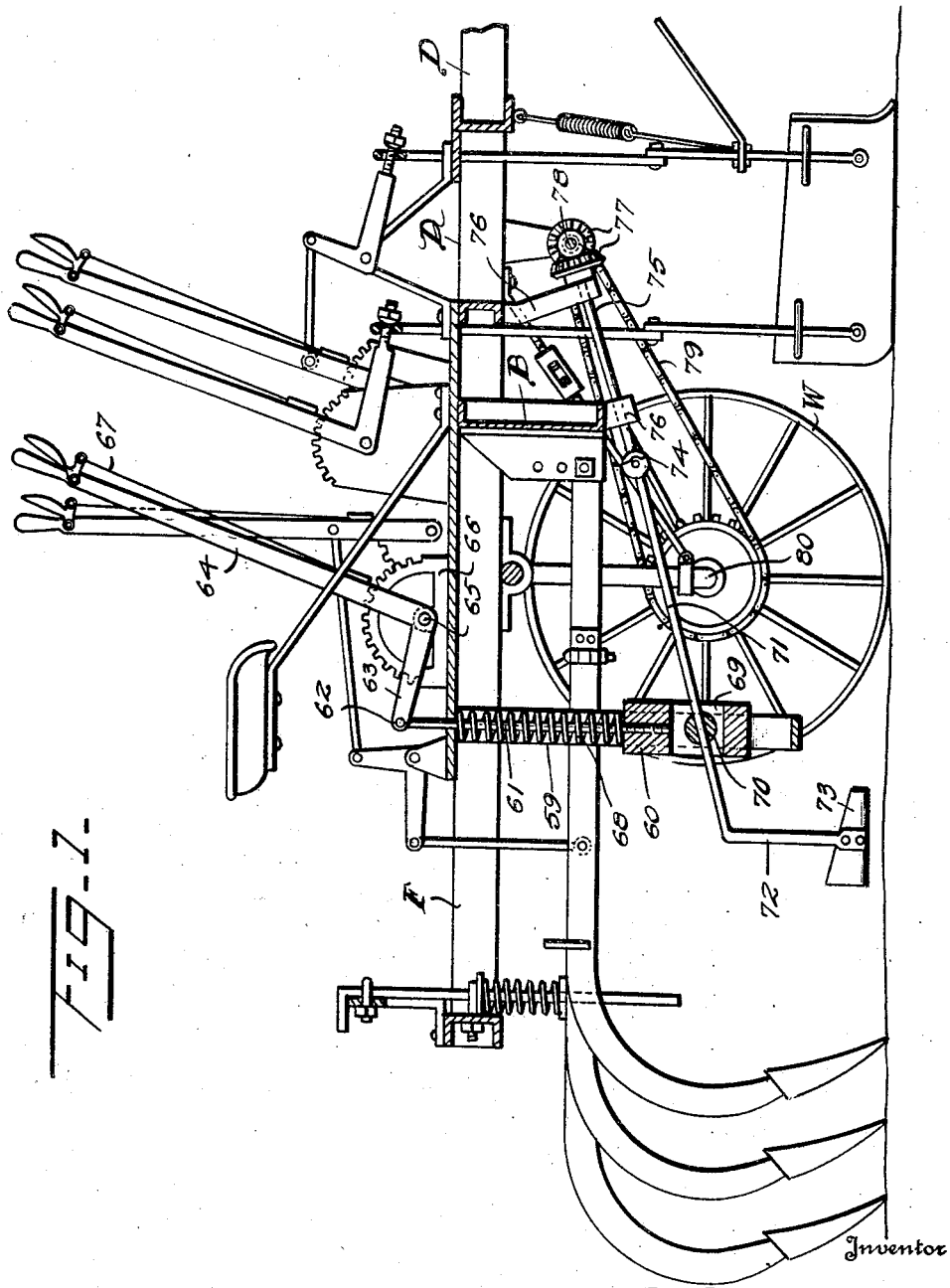

Patented Feb. 2, 1926.

1,571,759

UNITED STATES PATENT OFFICE.

RUBIN L. DIAMOND, OF McHENRY, MISSISSIPPI, ASSIGNOR OF ONE-HALF TO JOHN S. ADKISON, OF McHENRY, MISSISSIPPI.

AGRICULTURAL IMPLEMENT.

Original application filed September 6, 1924, Serial No. 736,341. Divided and this application filed May 14, 1925. Serial No. 30,331.

*To all whom it may concern:*

Be it known that I, RUBIN L. DIAMOND, a citizen of the United States, residing at McHenry, in the county of Stone and State of Mississippi, have invented certain new and useful Improvements in Agricultural Implements, of which the following is a specification, reference being had to the accompanying drawings, the same being a division of my pending application Serial No. 736,341, filed September 6, 1924.

This invention relates to agricultural implements and has relation more particularly to a device of this general character comprising a chopper together with means whereby said chopper may be adjusted as preferred.

The invention consists in the details of construction and in the combination and arrangement of the several parts of my improved agricultural implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in vertical section taken through an agricultural implement constructed in accordance with an embodiment of my invention;

Figure 2 is a view in top plan of the structure as herein disclosed;

Figure 3 is a fragmentary view in elevation of the mounting for the chopper as herein set forth.

As disclosed in the accompanying drawings, F denotes a frame mounted upon the arched axle A which is provided at its forward end portion with a suitable draft rigging D. Depending from the frame F at a predetermined point in advance of the axle A and extending transversely thereof is a cross member or beam B with which may be operatively engaged suitable ground working members as particularly shown in my pending application Serial No. 736,341, filed September 6, 1924, of which the present application is a division.

Secured to and overlying the central portion of the frame F is a flooring 19 and depending from the rear portion of said flooring 19 and at substantially its transverse center is a substantially U-shaped member 59 which forms a guide-way for the sliding block or bearing 60. This bearing has extending upwardly therefrom a rod 61 which is directed through the flooring 19 and has its upper end portion operatively engaged, as at 62, with the rock arm 63 carried by the pivoted end portion of the hand lever 64. This lever 64 is pivotally connected, as at 65, with an upstanding rack 66 carried by the flooring 19 and the lever 64 is also provided with a latch mechanism 67 coacting in a well-known manner with said rack 66. Interposed between the flooring 19 and the block or bearings 60 is an expansible member 68, herein disclosed as a coil spring, surrounding the rod 61 and which serves to constantly urge the block or bearing 60 downwardly. By proper manipulation of the lever 64 said block may be raised as desired.

The block or bearing 60 is provided with a central opening 69 in which is arranged a rock bearing 70 through which is disposed the shaft 71. The rear end portion of the shaft 71 is provided with a depending arm 72 carrying the chopper blade 73. The forward end portion of the shaft 71 is connected by a universal joint 74 with the shaft 75 rotatably supported by the bearing 76 carried by the frame F. The forward end portion of the shaft 75 is in driven connection through the medium of the gears 77 with the transversely disposed shaft 78 rotatably supported by the frame F and extending to one side thereof. The extended portion of the shaft 78 is operatively connected by the chain 79 with one of the supporting wheels W mounted upon the spindles 80 of the axle A so that when the implement is in transit requisite rotation will be imparted to the shaft 71 to effect the desired chopping action. When desired, the block or bearing 60 may be raised sufficiently to render the blade 73 inoperative or if preferred the gears 77 may be disconnected.

From the foregoing description it is thought to be obvious that an agricultural implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

An agricultural implement comprising a portable body, a substantially U-shaped guide depending from said body, a block slidably supported within said guide, a rod secured to and extending upwardly from the block, means coacting with the upper portion of the rod for raising and lowering the block, means for constantly urging the block downwardly, said block being provided with an opening in its central portion, a rock bearing carried by said block and disposed across said opening, a shaft disposed through and rotatably supported by said rock bearing, a ground engaging member carried by the shaft, a driven shaft, and a universal connection between both of said shafts.

In testimony whereof I hereunto affix my signature.

RUBIN L. DIAMOND.